Dec. 9, 1924. 1,518,801

J. O. McARTHUR

PISTON

Filed Oct. 4, 1923

Inventor
John O. McArthur
By Philip A. Ferrell
Attorney

Patented Dec. 9, 1924.

1,518,801

UNITED STATES PATENT OFFICE.

JOHN OLIVER McARTHUR, OF PHILADELPHIA, PENNSYLVANIA.

PISTON.

Application filed October 4, 1923. Serial No. 666,500.

*To all whom it may concern:*

Be it known that I, JOHN OLIVER MC-ARTHUR, a citizen of the United States, residing at Philadelphia, in the county of Philadelphia and State of Pennsylvania, have invented certain new and useful Improvements in Pistons, of which the following is a specification, reference being had therein to the accompanying drawings.

The invention relates to pistons particularly of the type used in horizontally disposed cylinders of locomotives, where the piston is particularly heavy weighing several hundred pounds, and has for its object to provide spring means for supporting the piston axially within the cylinder incident to the wear on the piston ring and the wear on the lower side of the inner wall of the cylinder.

A further object is to provide means whereby the same size springs may be used for supporting the piston and forcing the piston ring sections outwardly, thereby obviating the possibility of springs of a greater expansive power being inadvertently placed in the wrong pocket, and to improve and render more practical the invention shown in patent issued to me October 18, 1921, Patent No. 1,394,204.

A further object is to provide the piston with radially disposed pockets, the lower pockets being shallow in relation to the upper pockets and adapted to receive in a compressed condition supporting springs of sufficient tension for supporting the weight of the piston in axial position within the cylinder against the slight expansive power of the upper springs which are the same size as the lower springs, but are not compressed to the extent of the lower piston supporting springs.

A further object is to provide in connection with a relatively heavy piston spring means for supporting the piston in axial position within a horizontally disposed cylinder, and interposed between the expansive ring and pockets in the piston and a piston ring surrounding the expansible ring.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
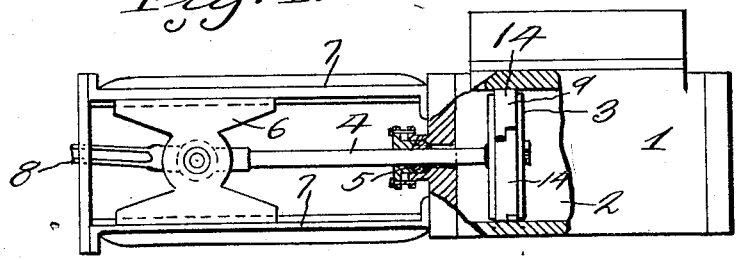
Figure 1 is a side elevation of a conventional form of horizontally disposed locomotive cylinder and crosshead, said cylinder being broken away to show the piston therein.
Figure 2:
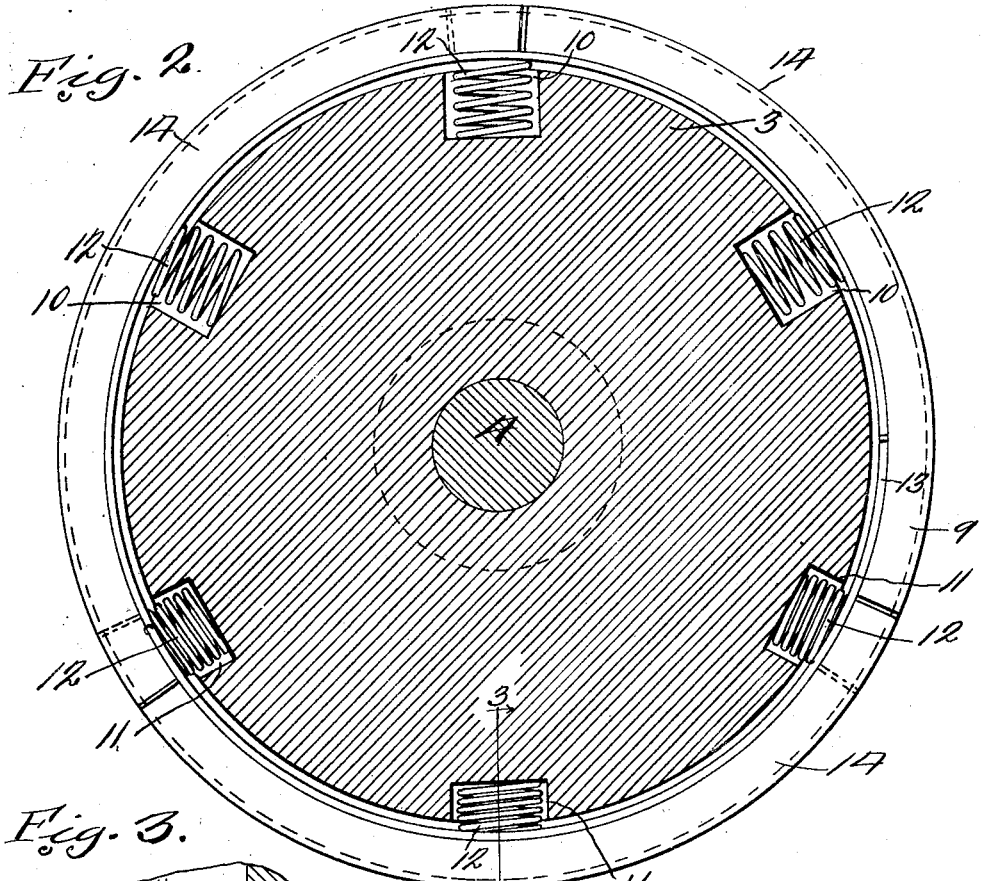
Figure 2 is a vertical transverse sectional view through the piston.
Figure 3:
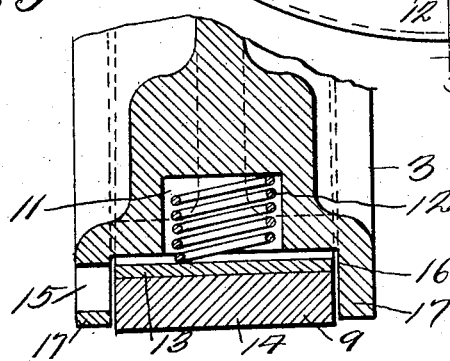
Figure 3 is an enlarged detail sectional view through one side of the piston taken on line 3—3 of Figure 2.

Referring to the drawing, the numeral 1 designates a conventional form of horizontally disposed locomotive cylinder and 2 the chamber therein. Disposed within the chamber 2 of the cylinder is a horizontally disposed piston 3, which piston is carried by a piston rod 4 which extends through the packing gland 5 and is connected to a crosshead 6. Crosshead 6 is slidably mounted in conventional forms of crosshead guides 7, and is reciprocated through the medium of a connecting rod 8 in the usual manner. It has been found, especially in locomotive cylinders, where the pistons are extremely heavy, weighing several hundred pounds that the lower sides of the cylinder 1 wears rapidly incident to friction and the sectional piston ring 9 also wears rapidly, while the wear at the upper side of the piston and cylinder is relatively slight. The wearing in the manner set forth is primarily caused by the weight of the piston and it will be seen that where the piston weighs several hundred pounds that this wear is rapid. As the wear takes place within the cylinder, it is obvious that the piston rod 4 will also wear within the gland 5, and at the present time it is necessary from time to time to place locomotives in a shop for repair purpose. To obviate the above difficulty the piston 3 is provided with radially disposed pockets 10 at its upper side, and with relatively shallow pockets 11 at its lower side. Disposed within the pockets 10 and 11 are coiled springs 12 for supporting the piston 3 in axial position within the cylinder 1. The springs 12 are of uniform size and are interchangeable from the pockets 10 to 11, thereby obviating the possibility of springs being placed in the wrong pockets as would be the case where the springs are not uniform in size as shown in the patent set forth above. The springs 12 and the pockets 11 and 10 are proportioned as to expansive power and depth of pockets whereby when the springs are in position with the lower springs compressed the piston 3 will be supported in axial position against its weight, at which time the upper springs will exert sufficient pressure to move the piston ring 9 outwardly to take up wear at the upper side of the piston and cylinder where the friction is slight and the wear relatively small. The lower springs 12 which support the weight of the piston 3 are considerably compressed as shown and consequently not only support the weight of the piston 3 but at the same time force the piston ring 9 outwardly for taking up wear thereon and on the lower side of the cylinder, where the wear is greatest and at the same time maintain the piston in substantial axial position within the cylinder 1.

The springs 12 are interposed between the bottoms of the pockets and the inner periphery of a split ring 13, therefore they uniformly expand the ring 13 and force the sections 14 of the piston ring 9 outwardly. The usual diameter of pistons of this character is twenty five inches, therefore it will be seen that the weight of the piston is considerable and that the wearing of the lower part of the cylinder and piston ring is rapid incident to the friction of a piston of this weight and size, as pistons of this character often weight six hundred pounds.

From the above it will be seen that a piston is provided wherein the weight thereof is supported by springs of uniform size, and one wherein the packing ring is forced outwardly incident to wear on the packing ring and cylinder and at the same time the piston is supported in axial position within the cylinder. One side of the piston 3 is provided with an aperture 15 whereby the piston ring 9 may be calibrated if desired without removing the piston from the cylinder.

The piston ring 9 and split ring 13 are disposed in an annular channel 16 of the piston and are slightly narrower than the width of said channel, thereby allowing the piston ring and split ring to move against either flange 17 of the piston according to the direction of movement of the piston and consequently allows steam to pass into the annular channel for exerting an expansive action on the split ring for additionally forcing the piston ring sections 14 outwardly.

The invention having been set forth what is claimed as new and useful is:—

1. The combination with a piston, said piston being horizontally disposed in a horizontal cylinder, a packing ring carried by said piston, of spring means cooperating with the packing ring and piston for supporting the weight of the piston in axial relation to the cylinder, said spring means comprising a plurality of springs of the same size and tension, the springs at the lower side of the cylinder being compressed more than the springs at the upper side thereof.

2. The combination with a piston, said piston being horizontally disposed in a horizontally disposed cylinder, a packing ring carried by said piston, of a plurality of springs interposed between the packing ring and the piston, the springs at the lower side of the piston supporting the weight of the piston in axial position and compressed more than the springs at the upper side of the piston, said springs being of uniform size.

3. The combination with a piston, said piston being horizontally disposed in a horizontally disposed cylinder, a packing ring carried by said piston, of a plurailty of coiled springs of uniform size interposed between the piston and packing ring, the lower springs being compressed more than the upper springs and supporting the piston in axial position within the cylinder.

4. The combination with a piston, said piston being horizontally disposed in a horizontally disposed cylinder, a packing ring carried by said piston, of a plurality of coiled springs of uniform size and strength interposed between the piston and packing ring, the springs below the horizontal center of the piston being compressed more than the springs above the horizontal center of the piston and forming means whereby the piston is supported in axial position within the cylinder.

5. The combination with a piston, said piston being horizontally disposed in a horizontally disposed cylinder, a packing ring carried by said piston, of a plurality of coiled springs of uniform size and strength interposed between the piston and the packing ring, the springs below the horizontal center of the piston being compressed more than the springs above the horizontally disposed center of the piston and forming means for supporting the weight of the piston, said spring being disposed in radially disposed pockets, the pockets above the horizontal center of the piston being deeper than the pockets below the horizontal center of the piston.

6. The combination with a piston, said piston being disposed in a horizontally disposed cylinder, a packing ring carried by said piston, of a plurality of radially disposed coiled springs, said springs being disposed in radially disposed pockets of the piston and interposed between the piston and packing ring, said coiled springs located below the horizontal center of the piston being compressed more than the springs above the horizontal center of the piston and supporting the piston in axial position within the cylinder.

In testimony whereof I hereunto affix my signature.

JOHN OLIVER McARTHUR.